United States Patent
Koseki et al.

(10) Patent No.: US 10,243,503 B2
(45) Date of Patent: Mar. 26, 2019

(54) DRIVE CONTROLLER AND DRIVE CONTROL METHOD FOR ELECTRIC MOTOR

(71) Applicant: HITACHI AUTOMOTIVE SYSTEMS, LTD., Hitachinaka-shi, Ibaraki (JP)

(72) Inventors: Tomonobu Koseki, Isesaki (JP); Tomishige Yatsugi, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/119,442

(22) PCT Filed: Jan. 21, 2015

(86) PCT No.: PCT/JP2015/051517
§ 371 (c)(1),
(2) Date: Aug. 17, 2016

(87) PCT Pub. No.: WO2015/125541
PCT Pub. Date: Aug. 27, 2015

(65) Prior Publication Data
US 2017/0012569 A1 Jan. 12, 2017

(30) Foreign Application Priority Data
Feb. 19, 2014 (JP) ................. 2014-029410

(51) Int. Cl.
*H02P 29/40* (2016.01)
*H02P 25/22* (2006.01)
(Continued)

(52) U.S. Cl.
CPC ............ *H02P 29/40* (2016.02); *B62D 5/0406* (2013.01); *B62D 5/0484* (2013.01); *H02P 25/22* (2013.01);
(Continued)

(58) Field of Classification Search
CPC .... H02P 29/40; H02P 29/0241; H02P 29/032; H02P 27/06; H02P 29/024
See application file for complete search history.

(56) References Cited

U.S. PATENT DOCUMENTS

2008/0067960 A1* 3/2008 Maeda ................... B62D 5/046
318/400.02
2009/0021207 A1* 1/2009 Kezobo ................ B62D 5/0484
318/798
(Continued)

FOREIGN PATENT DOCUMENTS

EP 2 548 757 A1 1/2013
JP 2011-078230 A 4/2011
(Continued)

OTHER PUBLICATIONS

Japanese Office Action dated Jun. 20, 2017 in Japanese Application No. 2014-029410 and its partial English translation.
(Continued)

Primary Examiner — Muhammad S Islam
(74) Attorney, Agent, or Firm — Foley & Lardner LLP

(57) ABSTRACT

The present invention relates to drive controller and control method for an electric motor equipped with coil sets corresponding to plural phases. The drive controller and control method for an electric motor of the present invention control, in case of abnormal energization that a potential of the coil reaches a power supply potential or a ground potential, at least one of a high-potential side switching element and a low-potential side switching element in a failed energization system involving the abnormal energization into ON state so as to reduce a phase-to-phase impedance and also, detect a braking torque generated in the energization system involving the abnormal energization to control an output of a
(Continued)

normal energization system not suffering from the abnormal energization based on the detected braking torque.

12 Claims, 12 Drawing Sheets

(51) Int. Cl.
H02P 29/032 (2016.01)
H02P 29/024 (2016.01)
H02P 27/06 (2006.01)
B62D 5/04 (2006.01)
H02P 27/08 (2006.01)

(52) U.S. Cl.
CPC .............. *H02P 27/06* (2013.01); *H02P 27/08* (2013.01); *H02P 29/024* (2013.01); *H02P 29/0241* (2016.02); *H02P 29/032* (2016.02)

(56) References Cited

U.S. PATENT DOCUMENTS

| | | | |
|---|---|---|---|
| 2010/0060222 A1* | 3/2010 | Kezobo | G01R 31/42 |
| | | | 318/490 |
| 2010/0263953 A1 | 10/2010 | Shimana | |
| 2011/0074323 A1* | 3/2011 | Mukai | B62D 5/0463 |
| | | | 318/400.21 |
| 2011/0074333 A1 | 3/2011 | Suzuki | |
| 2011/0156623 A1* | 6/2011 | Nakamura | H02P 5/74 |
| | | | 318/400.02 |
| 2011/0156626 A1* | 6/2011 | Mukai | B62D 5/0487 |
| | | | 318/400.21 |
| 2012/0019181 A1* | 1/2012 | Suzuki | H02P 27/06 |
| | | | 318/400.21 |
| 2013/0181645 A1 | 7/2013 | Koepken et al. | |
| 2013/0257232 A1* | 10/2013 | Tomizawa | H02K 29/08 |
| | | | 310/68 R |
| 2013/0320905 A1* | 12/2013 | Uryu | H02K 11/001 |
| | | | 318/490 |
| 2014/0009093 A1* | 1/2014 | Suzuki | H02P 21/0096 |
| | | | 318/400.02 |
| 2014/0097776 A1* | 4/2014 | Hayashi | H02P 6/20 |
| | | | 318/400.21 |
| 2014/0368150 A1* | 12/2014 | Furukawa | B62D 5/0403 |
| | | | 318/564 |

FOREIGN PATENT DOCUMENTS

| | | |
|---|---|---|
| JP | 2013-176215 | 9/2013 |
| JP | 2014-014240 A | 1/2014 |
| JP | 2014-192950 A | 10/2014 |
| WO | WO-2009/101729 A1 | 8/2009 |
| WO | WO-2013/125057 A1 | 8/2013 |

OTHER PUBLICATIONS

German Office Action dated Aug. 30, 2018, in German Application No. 11 2015 000 872.1 and its partial English translation.
Japanese Office Action dated Jun. 20, 2015 in Japanese Application No. 2014-029410 and its partial English translation.

\* cited by examiner

FIG.5

| | STATE (ON/OFF CONTROL) OF EACH SWITCHING ELEMENT | | | | | | POWER SUPPLY RELAY |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | |
| U-PHASE High-SIDE SHORT | SHORT | OFF | OFF | ON | ON | ON | OFF |
| V-PHASE High-SIDE SHORT | OFF | SHORT | OFF | ON | ON | ON | OFF |
| W-PHASE High-SIDE SHORT | OFF | OFF | SHORT | ON | ON | ON | OFF |
| U-PHASE Low-SIDE SHORT | ON | ON | ON | SHORT | OFF | OFF | OFF |
| V-PHASE Low-SIDE SHORT | ON | ON | ON | OFF | SHORT | OFF | OFF |
| W-PHASE Low-SIDE SHORT | ON | ON | ON | OFF | OFF | SHORT | OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | ON | ON | ON | OFF | OFF | OFF | OFF |
| V-PHASE LINE GROUNDED | ON | ON | ON | OFF | OFF | OFF | OFF |
| W-PHASE LINE GROUNDED | ON | ON | ON | OFF | OFF | OFF | OFF |

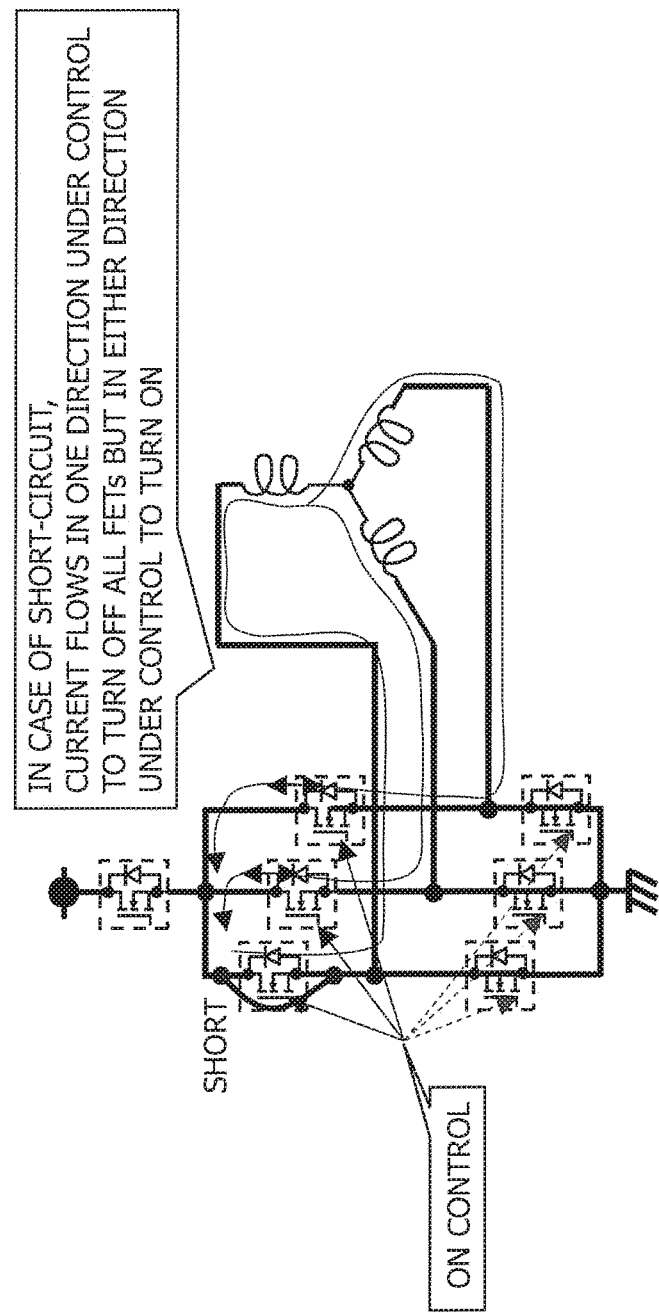

FIG.7

| | STATE (ON/OFF CONTROL) OF EACH SWITCHING ELEMENT | | | | | | POWER SUPPLY RELAY |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | |
| U-PHASE High-SIDE SHORT | SHORT | ON | ON | ON | ON | ON | OFF |
| V-PHASE High-SIDE SHORT | ON | SHORT | ON | ON | ON | ON | OFF |
| W-PHASE High-SIDE SHORT | ON | ON | SHORT | ON | ON | ON | OFF |
| U-PHASE Low-SIDE SHORT | ON | ON | ON | SHORT | ON | ON | OFF |
| V-PHASE Low-SIDE SHORT | ON | ON | ON | ON | SHORT | ON | OFF |
| W-PHASE Low-SIDE SHORT | ON | ON | ON | ON | ON | SHORT | OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | ON | ON | ON | ON | ON | ON | OFF |
| V-PHASE LINE GROUNDED | ON | ON | ON | ON | ON | ON | OFF |
| W-PHASE LINE GROUNDED | ON | ON | ON | ON | ON | ON | OFF |

FIG.8

| | STATE (ON/OFF CONTROL) OF EACH SWITCHING ELEMENT ||||||| |
|---|---|---|---|---|---|---|---|
| | U-PHASE High-SIDE | V-PHASE High-SIDE | W-PHASE High-SIDE | U-PHASE Low-SIDE | V-PHASE Low-SIDE | W-PHASE Low-SIDE | POWER SUPPLY RELAY |
| U-PHASE High-SIDE SHORT | SHORT | ON | ON | OFF | OFF | OFF | ON OR OFF |
| V-PHASE High-SIDE SHORT | ON | SHORT | ON | OFF | OFF | OFF | ON OR OFF |
| W-PHASE High-SIDE SHORT | ON | ON | SHORT | OFF | OFF | OFF | ON OR OFF |
| U-PHASE Low-SIDE SHORT | OFF | OFF | OFF | SHORT | ON | ON | ON OR OFF |
| V-PHASE Low-SIDE SHORT | OFF | OFF | OFF | ON | SHORT | ON | ON OR OFF |
| W-PHASE Low-SIDE SHORT | OFF | OFF | OFF | ON | ON | SHORT | ON OR OFF |
| U-PHASE LINE SHORTED TO POWER SUPPLY (UPSTREAM OF POWER SUPPLY RELAY) | ON | ON | ON | OFF | OFF | OFF | ON OR OFF |
| V-PHASE LINE SHORTED TO POWER SUPPLY (UPSTREAM OF POWER SUPPLY RELAY) | ON | ON | ON | OFF | OFF | OFF | ON OR OFF |
| W-PHASE LINE SHORTED TO POWER SUPPLY (UPSTREAM OF POWER SUPPLY RELAY) | ON | ON | ON | OFF | OFF | OFF | ON OR OFF |
| U-PHASE LINE GROUNDED | OFF | OFF | OFF | ON | ON | ON | ON OR OFF |
| V-PHASE LINE GROUNDED | OFF | OFF | OFF | ON | ON | ON | ON OR OFF |
| W-PHASE LINE GROUNDED | OFF | OFF | OFF | ON | ON | ON | ON OR OFF |

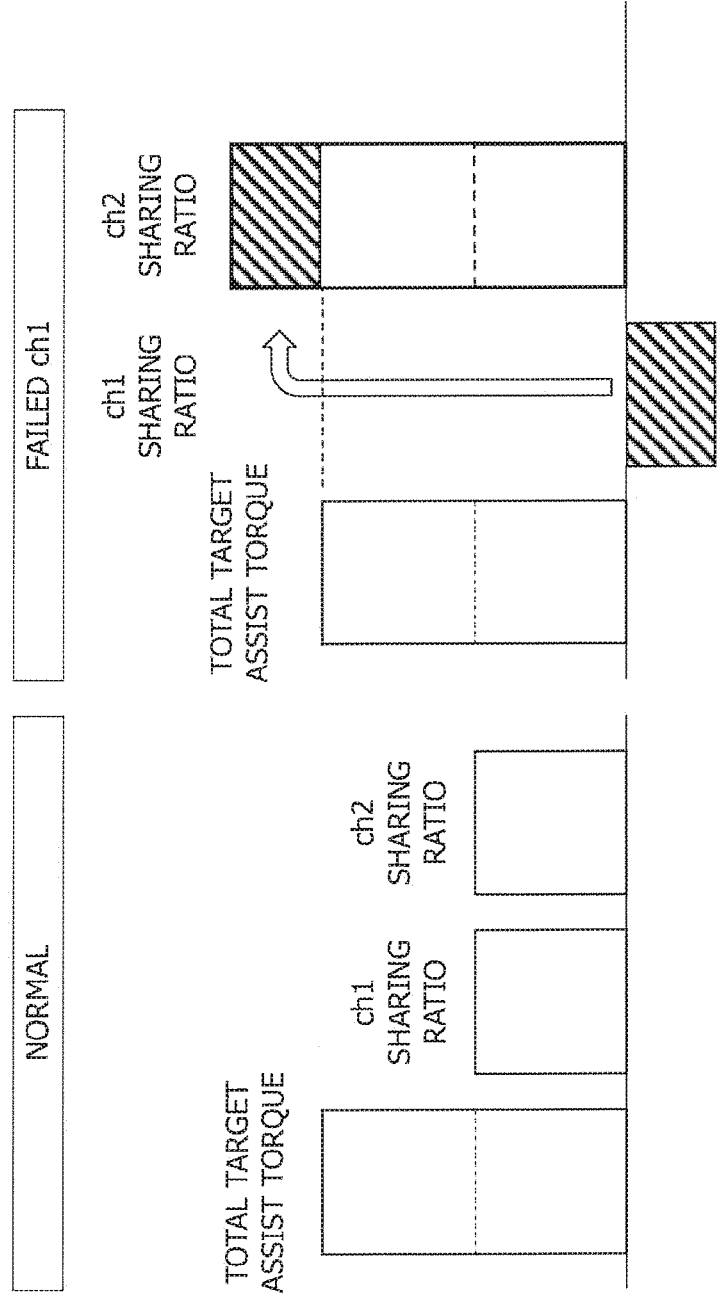

DRIVE CONTROLLER AND DRIVE CONTROL METHOD FOR ELECTRIC MOTOR

TECHNICAL FIELD

The present invention relates to a drive controller for an electric motor equipped with coil sets corresponding to plural phases, and to a drive control method therefor.

BACKGROUND ART

Patent Document 1 discloses a controller for a multi-phase rotating machine, which is configured as follows. In case either the first inverter or the second inverter suffers from short-circuiting, all the MOS (Metal-Oxide-Semiconductor) in the failed system are turned OFF to stop the failed system from driving the motor, and the MOS transistors in the system that is normally operating are controlled so as to cancel out the braking torque generated in the failed system or minimize the influence thereof on the driving of the motor.

REFERENCE DOCUMENT LIST

Patent Document

Patent Document 1: JP 2011-078230 A

SUMMARY OF THE INVENTION

Problems to be Solved by the Invention

Meanwhile, if all switching elements in the failed energization system are turned OFF, braking current flows from a short-circuited switching element of a given phase to an element of another phase along a channel direction of a parasitic diode of the switching element, whereas current flow from the switching element of the other phase to the failed one is blocked by the parasitic diode of the switching element controlled into OFF state.

Therefore, the braking current shows a half-wave form, which arises a problem that an unfailed, normal energization system is hardly controlled with high accuracy so as to cancel out a braking torque.

The present invention has been accomplished in view of some of the above problems and accordingly it is an object of the present invention to provide drive controller and control method for an electric motor, which can easily compensate for a braking torque in an energization system involving abnormal energization by controlling an energization system free from such abnormal energization.

Means for Solving the Problems

In order to achieve the above object, the present invention provides a drive controller for an electric motor equipped with a plurality of energization systems composed of coils corresponding to a plurality of phases, and a high-potential side switching element and a low-potential side switching element, both of which are provided in each of the phases, the drive controller comprising: a first control unit configured to execute control to turn ON at least one of the high-potential side switching element and the low-potential side switching element in a failed one out of the energization systems, which involves abnormal energization that a potential of the coil reaches a power supply potential or a ground potential, so as to reduce a phase-to-phase impedance; and a second control unit configured to control an output of a normal one out of the energization systems, which does not suffer from the abnormal energization, based on a torque generated in the energization system involving the abnormal energization.

Furthermore, the present invention provides a drive control method for an electric motor equipped with a plurality of energization systems composed of coils corresponding to a plurality of phases, and a high-potential side switching element and a low-potential side switching element, both of which are provided in each of the phases, the method comprising the steps of: detecting occurrence of abnormal energization that a potential of the coil reaches a power supply potential or a ground potential; executing control to turn ON at least one of the high-potential side switching element and the low-potential side switching element in a failed one out of the energization systems, which involves the abnormal energization, so as to reduce a phase-to-phase impedance; and controlling an output of a normal one out of the energization systems, which does not suffer from the abnormal energization, based on a torque generated in the energization system involving the abnormal energization.

Effects of the Invention

According to the present invention, the energization system involving abnormal energization can generate continuous braking current, whereby the braking current, i.e., a braking torque can be calculated with high accuracy, and an output of an energization system free from such abnormal energization can be easily controlled with high accuracy.

BRIEF DESCRIPTION OF THE DRAWINGS

FIG. 5 illustrates an example of ON/OFF control patterns for semiconductor switching elements in case of abnormal energization according to an embodiment of the present invention.

FIG. 6 illustrates the current flow at the time when one of high-potential side semiconductor switching elements suffers from short-circuiting and hereby all the semiconductor switching elements are controlled to OFF state according to an embodiment of the present invention.

FIG. 7 illustrates an example of control patterns for semiconductor switching elements in case of abnormal energization according to an embodiment of the present invention.

FIG. 8 illustrates an example of control patterns for semiconductor switching elements in case of abnormal energization according to an embodiment of the present invention.

FIG. 9 is an explanatory view illustrating an example of setting a target assist torque for each energization system in case of abnormal energization according to an embodiment of the present invention.

MODE FOR CARRYING OUT THE INVENTION

Figure 1:
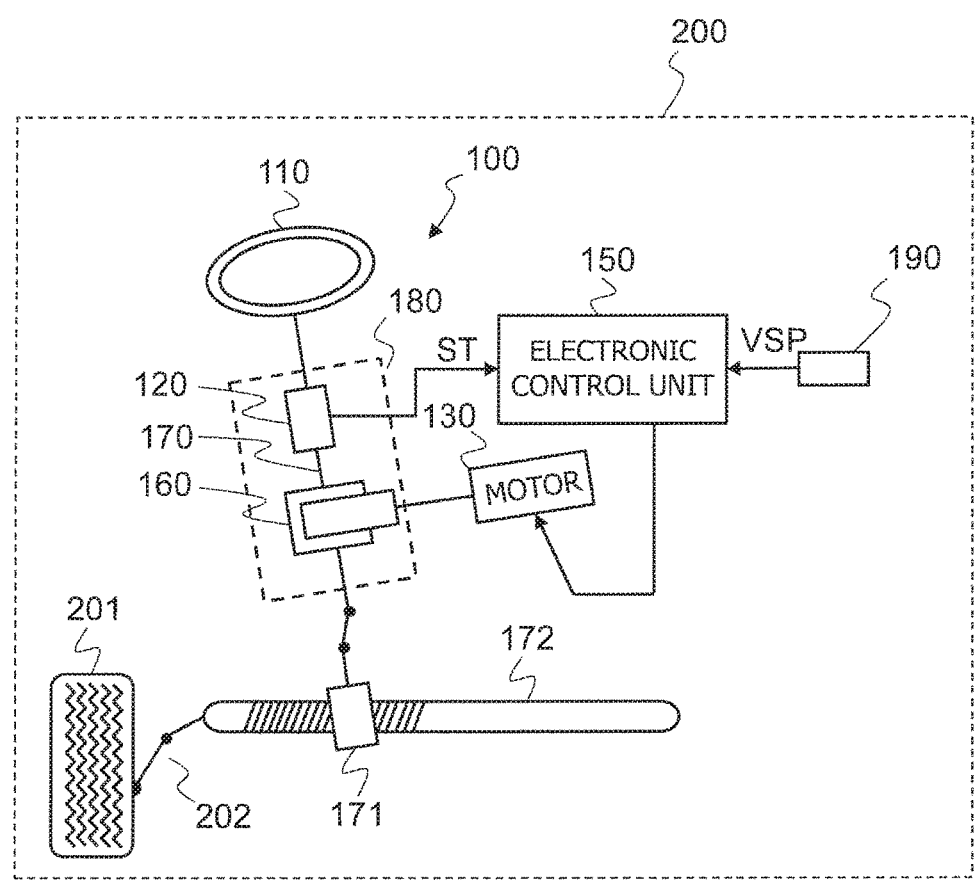
FIG. 1 is a schematic diagram of an electric power steering device that adopt drive controller and control method for an electric motor according to an embodiment of the present invention.

Hereinafter, an embodiment of the present invention will be described. FIG. 1 illustrates the configuration of a vehicle electric power steering device that adopts the drive controller and control method for an electric motor according to the present invention.

An electric power steering device 100 in FIG. 1, which is installed in a vehicle 200, generates a steering assist force with an electric motor 130.

Electric power steering device 100 is composed of a steering wheel 110, a steering torque sensor 120, electric motor 130, an electronic control unit 150, a reducer 160 that reduces a rotational speed of electric motor 130 and then transmits the reduced rotational speed to a steering shaft (pinion shaft) 170, and the like.

Steering torque sensor 120 and reducer 160 are disposed in a steering column 180 that accommodates steering shaft 170.

A pinion gear 171 is provided at the tip end of steering shaft 170. Along with the rotation of pinion gear 171, a rack gear 172 is horizontally moved to the left or right as viewed in the travel direction of vehicle 200. A steering mechanism 202 for a wheel 201 is provided at the opposite ends of rack gear 172. Along with the horizontal movement of rack gear 172, wheel 201 can change its direction.

Steering torque sensor 120 detects a steering torque of steering shaft 170 generated as a driver steers the vehicle, and then outputs a signal ST indicating the detected steering torque to electronic control unit 150.

Electronic control unit 150 serving as a drive controller for electric power steering device 100 includes a microcomputer, an inverter for driving electric motor 130, an inverter drive circuit, etc. and receives information about a state variable for determining a steering assist force such as steering torque signal ST and a vehicle speed signal VSP output from a vehicle speed sensor 190.

When receiving steering torque signal ST, vehicle speed signal VSP, or the like, electronic control unit 150 controls energization to electric motor 130 based on the driving condition of a vehicle indicated by these signals, thereby controlling the torque generated in electric motor 130, i.e., steering assist force.

Regarding the inverter and the inverter drive circuit incorporated in electronic control unit 150, the inverter can be provided alone or together with the inverter drive circuit independently outside electronic control unit 150. In this case, electronic control unit 150 constitutes, together with the external inverter or both the external inverter and inverter drive circuit, the drive controller for electric motor 130.

Figure 2:
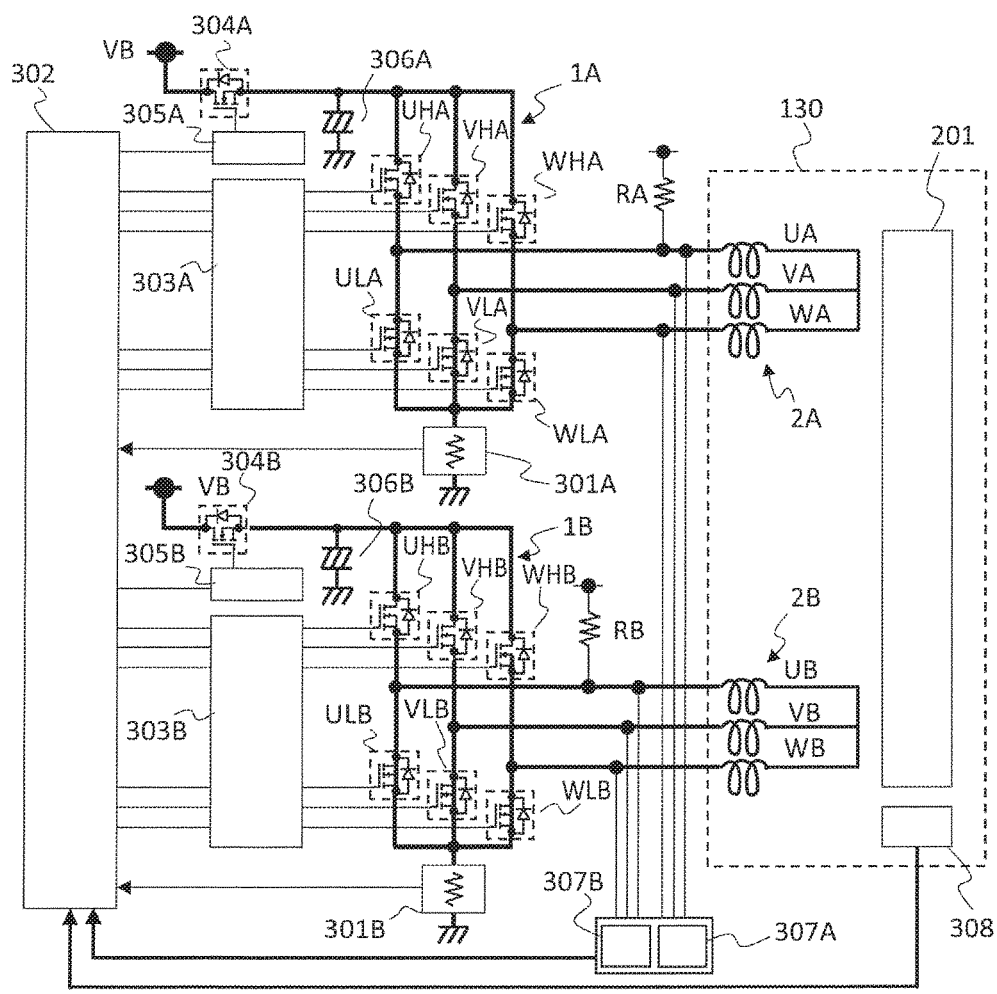
FIG. 2 is a circuit diagram of a drive controller according to an embodiment of the present invention.

FIG. 2 illustrates the circuit configuration of electronic control unit 150 and electric motor 130.

Electric motor 130 is a three-phase synchronous electric motor composed of a first coil set 2A of star-connected three-phase coils UA, VA, and WA and a second coil set 2B of star-connected three-phase coils UB, VB, and WB. In first coil set 2A and second coil set 2B, a connection point among three-phase coils U, V, and W is a neutral point.

First coil set 2A and second coil set 2B are disposed in an unillustrated cylindrical stator and a permanent magnet rotator 201 is rotatably provided inside a space formed at the central portion of the stator. First coil set 2A and second coil set 2B share a magnetic circuit.

Moreover, first coil set 2A is directly connected to a first inverter 1A, and second coil set 2B is directly connected to a second inverter 1B. First inverter 1A supplies power to first coil set 2A, and second inverter 1B supplies power to second coil set 2B.

First inverter 1A is configured by a three-phase bridge circuit including three pairs of semiconductor switches, i.e., semiconductor switches UHA and ULA for driving a U-phase coil UA of first coil set 2A, semiconductor switches VHA and VLA for driving a V-phase coil VA thereof, and semiconductor switches WHA and WLA for driving a W-phase coil WA thereof.

Moreover, second inverter 1B is configured by a three-phase bridge circuit including three pairs of semiconductor switches, i.e., semiconductor switches UHB and ULB for driving a U-phase coil UB of second coil set 2B, semiconductor switches VHB and VLB for driving a V-phase coil VB thereof, and semiconductor switches WHB and WLB for driving a W-phase coil WB thereof.

In this embodiment, the semiconductor switches constituting first inverter 1A and second inverter 1B are N-channel MOSFETs (Metal-Oxide-Semiconductor-Field-Effect-Transistors).

In first inverter 1A and second inverter 1B, semiconductor switches UH and UL have series-connected drain and source between a power supply VB and the ground point, and a connection point between semiconductor switches UH and UL is connected to a U-phase coil U.

Furthermore, in first inverter 1A and second inverter 1B, semiconductor switches VH and VL have series-connected drain and source between power supply VB and the ground point, and a connection point between semiconductor switches VH and VL is connected to a V-phase coil V.

Moreover, in first inverter 1A and second inverter 1B, semiconductor switches WH and WL have series-connected drain and source between power supply VB and the ground point, and a connection point between semiconductor switches WH and WL is connected to a W-phase coil W.

Moreover, in first inverter 1A and second inverter 1B, current sensors 301A and 301B for detecting drive current for electric motor 130 are connected between a source of each of low-potential side semiconductor switches UL, VL, and WL and the ground point.

Outputs from current sensors 301A and 301B are input to a microcomputer 302 including a CPU, a ROM, a RAM, an I/O circuit, and the like.

A first drive circuit 303A functions to drive the semiconductor switches constituting first inverter 1A, and includes three high-potential side drivers for respectively driving semiconductor switches VHA, UHA, and WHA as high-potential side switching elements in first inverter 1A, and three low-potential side drivers for respectively driving semiconductor switches VLA, ULA, and WLA as low-potential side switching elements in first inverter 1A.

Note that the high-potential side switching element can be referred to as "upstream drive element" or "upper arm". The low-potential side switching element can be referred to as "downstream drive element" or "lower arm".

Furthermore, a second drive circuit 303B functions to drive the semiconductor switches constituting second inverter 1B, and includes three high-potential side drivers for respectively driving semiconductor switches VHB, UHB, and WHB as high-potential side switching elements in second inverter 1B, and three low-potential side drivers for respectively driving semiconductor switches VLB, ULB, and WLB as low-potential side switching elements in second inverter 1B.

First drive circuit 303A and second drive circuit 303B drive the semiconductor switches constituting inverters 1A and 1B, respectively through PWM (Pulse Width Modulation) control according to a command signal from microcomputer 302.

As described above, first inverter 1A and second inverter 1B respectively serve as the energization system composed of high-potential side switching elements and the one composed of low-potential side switching elements, the high and low-potential side switching elements being provided in correspondence with the three phases. Electronic control unit 150 of this embodiment includes two energization systems: the first energization system of first inverter 1A and the second energization system of second inverter 1B.

A power supply relay 304A is provided between power supply VB and first inverter 1A in order to interrupt the power supply to first inverter 1A, and a power supply relay 304B is provided between power supply VB and second inverter 1B in order to interrupt the power supply to second inverter 1B.

In this embodiment, power supply relays 304A and 304B are configured by semiconductor switches such as N-channel MOSFETs. The semiconductor switches constituting power supply relays 304A and 304B are driven by drive circuits 305A and 305B.

As power supply relays 304A and 304B, electromagnetic relays, each of which provides electrical switching by physically moving its contact point, may be alternatively used.

Drive circuits 305A and 305B of power supply relays 304A and 304B drive the semiconductor switches constituting power supply relays 304A and 304B according to a command signal from microcomputer 302. To be specific, microcomputer 302 can independently interrupt power supply to first inverter 1A and power supply to second inverter 1B.

Furthermore, in order to reduce fluctuations in power supply voltage to inverters 1A and 1B, capacitors 306A and 306B are provided. More specifically, capacitor 306A connects, to the ground point, the power supply line between power supply relay 304A and inverter 1A, whereas capacitor 306B connects, to the ground point, the power supply line between power supply relay 304B and inverter 1B.

Also, there are provided a voltage monitor circuit 307A for detecting coil-end voltage in coil set 2A, and a voltage monitor circuit 307B for detecting coil-end voltage in coil set 2B. Voltage monitor circuits 307A and 307B output, to microcomputer 302, signals indicating detected coil-end voltages in coil sets 2A and 2B. In addition, to keep the coil-end potential in coil set 2A fixed even when all the switching elements in inverter 1A are turned OFF, a pull-up resister RA for pulling up U-phase coil UA in coil set 2A is provided. To keep the coil-end potentials in coil set 2B fixed even when all the switching elements in inverter 1B are turned OFF, a pull-up resister RB for pulling up U-phase coil UB in coil set 2B is provided.

An angle sensor 308 detects the angle of rotor 201, and outputs a signal indicating the detected angle to microcomputer 302.

Figure 3:
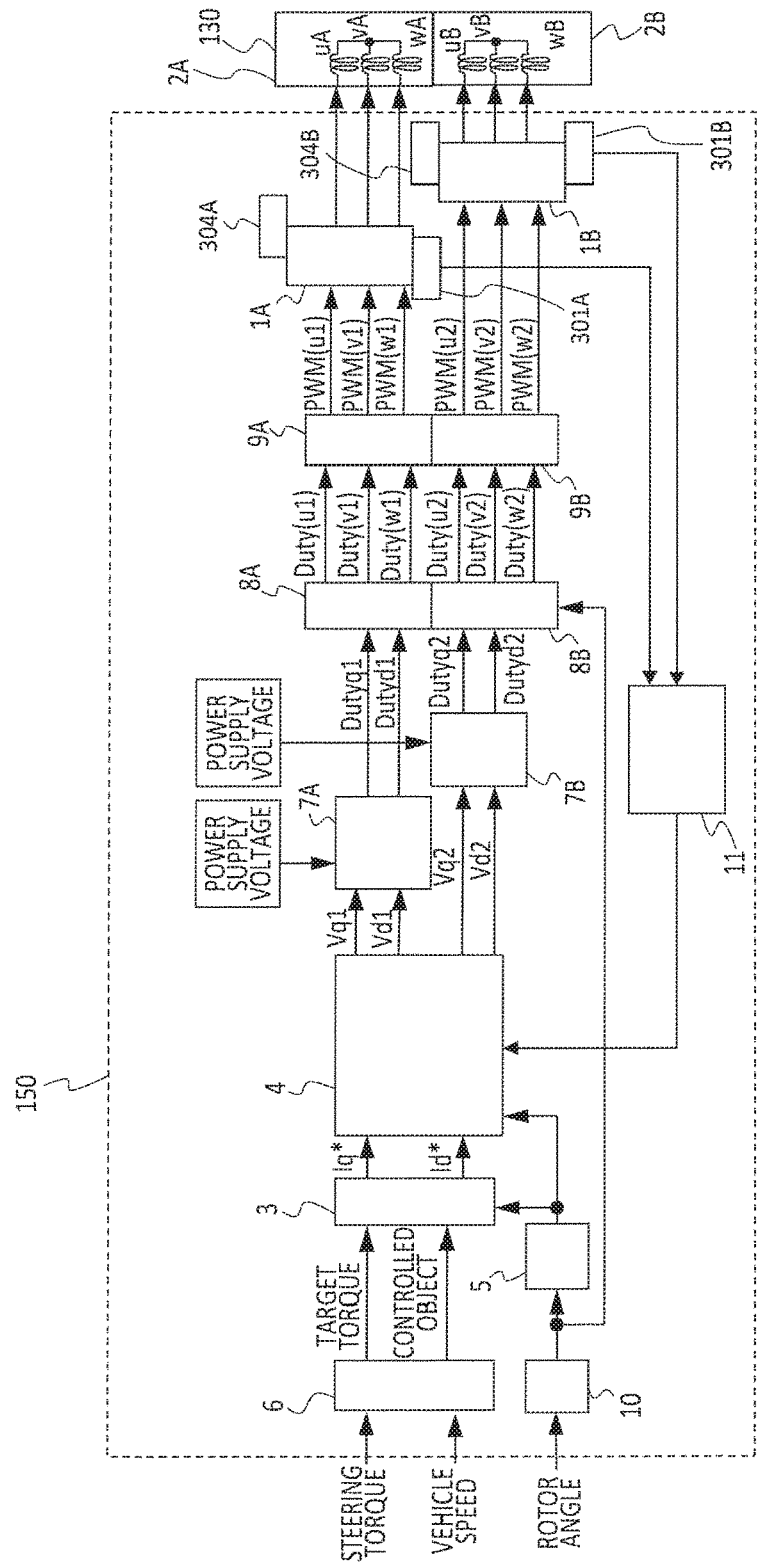
FIG. 3 is a functional block diagram of a drive controller according to an embodiment of the present invention.

FIG. 3 is a functional block diagram illustrating an example of the function of controlling inverters 1A and 1B, which is implemented by microcomputer 302.

A target assist torque calculating unit 6 calculates a target assist torque, i.e., a target value of an output torque of electric motor 130 based on steering conditions such as steering force a driver applies to the steering wheel, which is detected by steering torque sensor 120 and a vehicle speed.

An angle calculating unit 10 receives a signal from angle sensor 308 and then calculates the angle of rotor 201 of electric motor 130.

A motor rotational speed calculating unit 5 calculates a rotational speed (rpm) of electric motor 130 based on information about the calculated angle of rotor 201 from angle calculating unit 10 and then outputs a signal indicating the calculated motor rotational speed to a target current value calculating unit 3 and an output voltage calculating unit 4.

Target current value calculating unit 3 receives data about the target assist torque and data about the rotational speed of electric motor 130, and then calculates a d-axis current command value $I_d^*$ and a q-axis current command value $I_q^*$ of electric motor 130, i.e., a target value of motor current based on the input data, thereby outputting the calculated values.

Output voltage calculating unit 4 receives d-axis current command value $I_d^*$ and q-axis current command value $I_q^*$ output from target current value calculating unit 3, and a d-axis actual current value $I_d$ and a q-axis actual current value $I_q$, which are calculated by an actual current calculating unit 11 and additionally receives data about the rotational speed of electric motor 130.

Output voltage calculating unit 4 calculates a d-axis voltage command value $V_d1$ and a q-axis voltage command value $V_q1$ of first inverter 1A and a d-axis voltage command value $V_d2$ and a q-axis voltage command value $V_q2$ of second inverter 1B and then outputs the calculated values.

Actual current calculating unit 11 receives output signals from current sensors 301A and 301B and calculates a d-axis actual current value $I_d1$ and a q-axis actual current value $I_q1$, i.e., actual motor current, hereby outputting the calculated values to output voltage calculating unit 4.

Then, d-axis voltage command value $V_d1$ and q-axis voltage command value $V_d1$ output from output voltage calculating unit 4 are input to a first output duty calculating unit 7A.

First output duty calculating unit 7A calculates a d-axis duty Dutyd1 and a q-axis duty Dutyq1 of first inverter 1A in PWM control, based on d-axis voltage command value $V_d1$, q-axis voltage command value $V_q1$, and the power supply voltage of first inverter 1A, and then outputs the calculated values.

Furthermore, d-axis voltage command value $V_d2$ and q-axis voltage command value $V_q2$ output form output voltage calculating unit 4 are input to a second output duty calculating unit 7B.

Second output duty calculating unit 7B calculates a d-axis duty Dutyd2 and a q-axis duty Dutyq2 of second inverter 1B in PWM control based on d-axis voltage command value $V_d2$, q-axis voltage command value $V_q2$, and the power supply voltage of second inverter 1B.

A first two-to-three phase converting unit 8A receives d-axis duty Dutyd1 and q-axis duty Dutyq1 output from first output duty calculating unit 7A and also information about the rotor angle in electric motor 130. First two-to-three phase converting unit 8A calculates, based on these, duty command values DutyU1, DutyV1, and DutyW1 of three phases in first coil set 2A, and then outputs the calculated values.

In addition, a second two-to-three phase converting unit 8B receives d-axis duty Dutyd2 and q-axis duty Dutyq2 output from second output duty calculating unit 7B and also information about the rotor angle in electric motor 130. Second two-to-three phase converting unit 8B calculates, based on these, duty command values DutyU2, DutyV2, and DutyW2 of three phases in second coil set 2B, and then outputs the calculated values.

A first dead time compensation unit 9A receives duty command values DutyU1, DutyV1, and DutyW1 output from first two-to-three phase converting unit 8A. First dead time compensation unit 9A compensates for the dead time thereof to obtain, by calculation, duty command values DutyU1, DutyV1, and DutyW1 and then outputs the calculated values to inverter 1A.

In addition, a second dead time compensation unit 9B receives duty command values DutyU2, DutyV2, and DutyW2 output from second two-to-three phase converting unit 8B. Second dead time compensation unit 9B compensates for the dead time thereof to obtain, by calculation, duty command values DutyU2, DutyV2, and DutyW2, and outputs the calculated values to inverter 1B.

The dead time compensation means the processing for suppressing a voltage drop etc. that will occur with a dead time voltage at the time of PWM control for retarding, by the dead time, the rising edge of a PWM signal indicating a result of comparing a triangular wave with a command value to thereby generate a gate signal so as not to cause short-circuiting between upper and lower arms of inverters 1A and 1B.

Furthermore, target assist torque calculating unit 6 functions to stop the PWM-based switching operation of a failed one (with abnormal energization) of the two energization systems. In addition, target assist torque calculating unit 6 functions to calculate a braking torque generated in the failed energization system, i.e., the energization system that stops the PWM-based switching operation, thereby changing a target assist torque for a normal energization system (without abnormal energization) according to the braking torque.

The abnormal energization in the energization system is such a fault that a potential of the coil equals the power supply potential or the ground potential. More specifically, it refers to a fault such as a short-circuit in any of high-potential side switching elements or low-potential side switching elements constituting inverters 1A and 1B, a short-to-ground of any of the three-phase drive lines, or a short-to-supply of any of the three-phase drive lines.

Here, the short-to-supply means a short-circuit between a power supply potential as the high-potential side and the drive line, and the short-to-ground means a short-circuit between the ground potential as the low-potential side and the drive line. As for the abnormal energization like the short-circuit in any high-potential side switching element and the short-to-supply of any drive line, a potential of the coil equals a power supply potential. As for the abnormal energization like the short-circuit in any low-potential side switching element and the short-to-ground of any drive line, a potential of the coil equals the ground potential.

The drive line means a power supply line from each output end of inverters 1A and 1B and each coil.

Microcomputer 302 makes a diagnosis on each energization system as to abnormal energization based on, for example, the control status of the respective switching elements constituting the inverter and a coil-end voltage and/or drive current, which is detected by a corresponding sensor. For example, microcomputer 302 makes a diagnosis as described below on each energization system as to whether the abnormal energization occurs.

Microcomputer 302 can make a diagnosis as to whether short-circuiting occurs in high-potential side switching elements or low-potential side switching elements, based on coil-end voltages under the condition that power supply relays 304A and 304B are turned ON and all the switching elements constituting inverters 1A and 1B are turned OFF. In addition, microcomputer 302 can make a diagnosis as to the short-to-supply or the short-to-ground based on the coil-end voltages under the condition that power supply relays 304A and 304B are turned OFF.

Also, microcomputer 302 can make a diagnosis as to whether short-circuiting occurs in the switching element based on a drive current under the PWM-based switching operation of the switching elements.

Then, microcomputer 302 executes control to hold the ON or OFF state of the switching elements constituting the inverter in the energization system that has been diagnosed as suffering from abnormal energization, according to a predetermined pattern, and then stops the switching operation of the inverter in the system involving the abnormal energization.

On the other hand, microcomputer 302 causes an inverter in a normal system not involving abnormal energization to continue the PWM-based switching operation and in addition, controls switching elements of the inverter in the normal system so as to reduce an adverse effect of motor driving with the energization system involving the abnormal energization. More specifically, microcomputer 302 causes target assist torque calculating unit 6 to change the calculation of a target assist torque so as to cancel out the braking torque generated in the coil of the energization system involving the abnormal energization.

Then, target assist torque calculating unit 6 calculates a target assist torque according to the fault diagnosis on each energization system as to whether abnormal energization occurs, and outputs a signal indicating the calculated target assist torque to target current value calculating unit 3 and also, determines which energization system should be subject to PWM control according to a target assist torque, based on the fault diagnosis as to whether abnormal energization occurs, thereby outputting a signal indicating the energization system to be controlled, toward target current value calculating unit 3.

Figure 4:
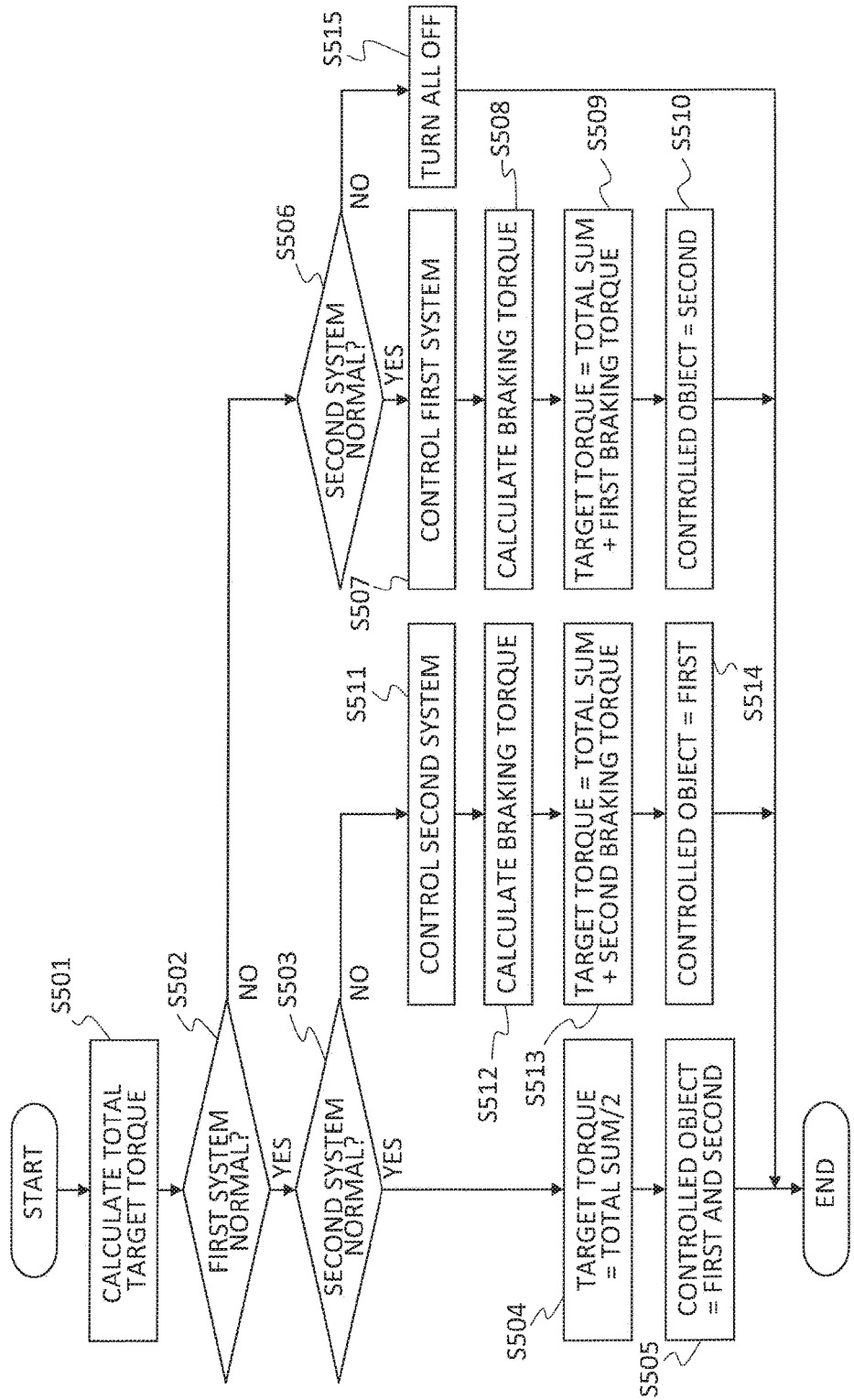
FIG. 4 is a flowchart illustrating the processing flow in case of abnormal energization according to an embodiment of the present invention.

Referring to a flowchart of FIG. 4, a detailed description is given of the flow of control executed on each energization system by electronic control unit 150 based on diagnoses on each energization system as to abnormal energization.

A routine illustrated in the flowchart of FIG. 4 is interruptedly performed at predetermined time intervals by electronic control unit 150.

First, in step S501, electronic control unit 150 calculates the total target assist torque based on the steering torque detected by steering torque sensor 120 or information about the vehicle speed.

The total target assist torque implies the total sum of a target value of a motor torque generated by controlling energization to first coil set 2A with the first energization system, and a target value of a motor torque generated by controlling energization to second coil set 2B with the second energization system.

In subsequent step S502, electronic control unit 150 determines whether the first energization system has been diagnosed as being free from abnormal energization, i.e., as being normal without a short-circuit in any switching element, a short-to-ground of the drive line, and a short-to-supply thereof.

Note that the first energization system can be referred to as a "first channel ch1" and the second energization system can be referred to as a "second channel ch2".

If determining that the first energization system is normal, electronic control unit 150 proceeds to step S503 to determine whether the second energization system has been diagnosed as being free from a fault, i.e., as being normal without a short-circuit in any switching element, a short-to-ground of the drive line, and a short-to-supply of the drive line.

Then, if the first energization system and the second energization system are both normal, electronic control unit 150 proceeds to step S504 to set a half of the total target assist torque as a target assist torque for each energization system.

To be specific, a target assist torque is set for each energization system such that the first energization system controls the energization to first coil set 2A, thereby generating an assist torque corresponding to a half of the total sum, while the second energization system controls the energization to second coil set 2B, thereby generating an assist torque corresponding to a half of the total target assist torque.

In other words, if both of first energization system and second energization system are normally operating, electronic control unit 150 sets the same output rate, i.e., 50% for first inverter 1A and second inverter 1B.

Electronic control unit 150 proceeds to step S505. In this step, semiconductor switching elements constituting inverters 1A and 1B of the first energization system and the second energization system are turned ON/OFF under the PWM control based on a target assist torque of each energization system.

On the other hand, if determining that the first energization system has been diagnosed as suffering from any fault in step S502, electronic control unit 150 proceeds to step S506.

In step S506, electronic control unit 150 determines whether the second energization system is normal, and if the first energization system suffers from any fault and the second energization system is normal, proceeds to step S507.

In step S507, electronic control unit 150 executes ON/OFF control on switching elements constituting first inverter 1A of the first energization system suffering from the fault, according to a pattern corresponding to the type of fault.

Note that the ON state of the switching element implies that a duty ratio is 100%, and the OFF state of the switching element implies that the duty ratio is 0%.

That is, electronic control unit 150 executes control not to just turn OFF all switching elements of the inverter in the energization system involving the fault but to turn ON at least one of the high-potential side switching element and the low-potential side switching element so as to decrease phase-to-phase impedance.

Moreover, electronic control unit 150 determines whether either or both of the high-potential side switching element and the low-potential side switching element is controlled into ON state according to the type of fault.

FIG. 5 illustrates an example of an ON/OFF control pattern for each switching element in first inverter 1A in step S507.

Note that the control patterns of FIG. 5 can apply to both of first inverter 1A and second inverter 1B. As described below, if the first energization system is normally operating while the second energization system suffers from any fault, the control patterns can be used for controlling the switching elements of second inverter 1B.

As illustrated in FIG. 5, in this embodiment, the fault is classified into four types: a short-circuit of any high-potential side switching element of the inverter; a short-circuit of any low-potential side switching element of the inverter; a short-to-supply of any phase drive line; and a short-to-ground of any phase drive line. To deal with the four types of fault, a pattern is set to turn ON at least one of the high-potential side switching element and the low-potential side switching element.

In the illustrated example of FIG. 5, if any high-potential side switching element in the inverter involves a short-circuit, electronic control unit selects a pattern to turn OFF all the high-potential side switching element while turning ON all the low-potential side switching elements.

Furthermore, in case of a short-circuit in any low-potential side switching element in the inverter, a short-to-supply of any phase drive line, or a short-to-ground of any phase drive line, electronic control unit selects a control pattern to execute control to turn ON all the high-potential side switching elements while turning OFF all the low-potential side switching elements.

Regarding power supply relay 304A that interrupts power supply to first inverter 1A of the first energization system suffering from any fault, if the fault is any one of a short-circuit of the high-potential side switching element, a short-circuit of the low-potential side switching element of the inverter, and a short-to-ground of the phase drive line, power supply relay 304A is turned OFF. In case of a short-to-supply of the phase drive line, however, it is possible to control power supply relay 304A into either ON or OFF state.

That is, in FIG. 5, "ON or OFF" in the field of power supply relay indicates that electronic control unit 150 can execute control to turn either ON or OFF power supply relay 304A.

Accordingly, electronic control unit can not only turn OFF power supply relay 304A regardless of the type of fault that occurs in the first energization system but also perform the following control: in case of a short-circuit of any high-potential side switching element, a short-circuit of any low-potential side switching element of the inverter, or a short-to-ground of any phase drive line, electronic control unit 150 turns OFF power supply relay 304A, and in case of a short-to-supply of any phase drive line, electronic control unit 150 keeps power supply relay 304A ON.

In case short-circuiting occurs in semiconductor switch UH out of the high-potential side switching elements of the inverter, if all the switching elements are turned OFF, a braking current flows into each phase due to an inductive voltage that is generated along with the rotation of electric motor 130 as illustrated in FIG. 6.

Note that the braking current means a current that induces a torque to weaken the motor driving force.

In this case, since semiconductor switches VH and WH are OFF, the current flow in semiconductor switches VH and WH is limited to a channel direction of each parasitic diode in semiconductor switches VH and WH.

In addition, low-potential side switching elements UL, VL, and WL are OFF, and parasitic diodes of low-potential side switching elements UL, VL, and WL block the current flow to the ground point, whereby no current flows through low-potential side switching elements UL, VL, and WL into the ground point.

Accordingly, the braking current flows from the U phase into the W phase and the V phase. After passing through the W phase, the current flows into semiconductor switch UH through the parasitic diode of semiconductor switch WH. After passing through the V phase, the current flows into semiconductor switch UH through the parasitic diode of semiconductor switch VH. The braking current flows into the U, V, and W phases only in one direction and thus shows a half-wave form.

In contrast, if short-circuiting occurs in any high-potential side switching element of the inverter, the electronic control unit executes control according to the control pattern illustrated in FIG. 5 to turn OFF all the high-potential side switching elements while turning ON all the low-potential side switching elements. By this control, the low-potential side switching elements in ON state allow bidirectional current flow, with the result that the braking current is continuously generated.

Moreover, if short-circuiting occurs in any high-potential side switching element of the inverter, the power supply to the inverter is interrupted by turning OFF the power supply relay. Thus, the power supply line is by no means short-circuited to the ground point through the short-circuited high-potential side switching element and the low-potential side switching element controlled to turn ON.

Furthermore, in case short-circuiting occurs in any low-potential side switching element, if the electronic control unit executes control to turn OFF all the high-potential side switching elements and the low-potential side switching elements, a braking current flows through a parasitic diode of a normal element not suffering from the short-circuiting out of the low-potential side switching elements, and then flows into the short-circuited low-potential side switching element. As a result, the braking current flows in the U, V, and W phases only in one direction and thus shows a half-wave form.

In contrast, when short-circuiting occurs in any low-potential side switching element of the inverter, if the electronic control unit executes control according to the control pattern of FIG. 5 to turn OFF all the low-potential side switching elements while turning ON all the high-potential side switching elements, the high-potential side switching elements in ON state allow bidirectional current flow and thus, the braking current is continuously generated.

Moreover, the power supply to the inverter is interrupted by turning OFF the power supply relay. As a result, the power supply line is by no means short-circuited to the ground point through the short-circuited low-potential side switching element and the high-potential side switching element controlled into ON state.

Moreover, when any drive line of each phase is short-circuited to the power supply, if the electronic control unit executes control to turn OFF all the low-potential side switching elements while turning ON all the high-potential side switching elements, the high-potential side switching elements in ON state allow bidirectional current flow and the braking current is continuously generated. In addition, the power supply line is by no means short-circuited to the ground point through the low-potential side switching element.

When any drive line of each phase is short-circuited to the power supply, even if the electronic control unit executes control to turn OFF the power supply relay, the power is supplied to the drive line short-circuited to the power supply, making it possible to keep the power supply relay ON as well as uniformly turn OFF the power supply relay regardless of the type of fault in the first energization system.

Furthermore, when any drive line of each phase is grounded, if the electronic control unit executes control to turn OFF all the low-potential side switching elements while turning ON all the high-potential side switching elements, the high-potential side switching elements in ON state allow bidirectional current flow. As a result, the braking current is continuously generated and in addition, the power supply to the inverter is interrupted by turning OFF the power supply relay. Thus, no power supply current flows into the ground point through the grounded portion.

As described above, the electronic control unit controls, according to the control pattern of FIG. 5, the switching elements of the inverter in the energization system suffering from abnormal energization so as to turn ON at least one of the high-potential side switching element and the low-potential side switching element of the energization system suffering from abnormal energization to reduce the impedance difference among phases. With this configuration, a continuous braking current, not half-wave, can be generated in the energization system that suffers from abnormal energization.

Then, at the time of executing compensation control to correct an output from the inverter in the normal energization system so as to cancel out the braking torque, the accuracy of detecting the braking current flowing in each phase is enhanced. As a result, the accuracy of compensation control increases.

Furthermore, compared to when all of the high-potential side switching elements and the low-potential side switching elements are turned OFF and then the braking current flows through a parasitic diode, if the low-potential side switching elements and the high-potential side switching element are controlled to turn ON, t phase-to-phase impedance can be reduced with little fluctuation and in addition, the generated braking current is less influenced by abnormal energization. Owing to the above control as well, the braking current can be calculated with high accuracy and the accuracy of compensation control for cancelling out the braking torque is enhanced.

Moreover, a continuous braking current is generated, making it easier to execute the compensation control for the target assist torque based on the braking current than the half-wave braking current. A control program can be hereby simplified. Hence, a development cost for the control program can be saved and the capacity of the control program can be reduced, leading to reduction in product cost.

Note that according to the control pattern illustrated in FIG. 5, electronic control unit 150 does not execute control to turn ON the switching element of the short-circuited system. As in the control pattern illustrated in FIG. 7, electronic control unit 150 can execute control to turn ON all the switching elements of not only the short-circuited system as well as a normal system.

Furthermore, in case any phase drive line is grounded, the power supply relay is controlled to turn OFF, hereby preventing a power supply current from flowing into the ground point through the grounded portion. Thus, electronic control unit 150 can execute control according to the control pattern of FIG. 7 to turn ON the high-potential side switching element and also turn ON the low-potential side switching element.

Note that in the control patterns of FIGS. 5 and 7, the same ON/OFF control is executed on the switching element and the power supply relay in case of a short-to-supply of any phase drive line.

Also even in the case of adopting the control pattern of FIG. 7, similar to the case of controlling the switching elements according to the control pattern of FIG. 5, similar advantageous functions and effects are achieved.

As in the control pattern of FIG. 8, in case short-circuiting occurs in any low-potential side switching element and in case short-circuiting occurs in any high-potential side switching element, electronic control unit 150 executes control to turn ON the switching elements in the short-circuited system and also turn OFF the switching elements in the normal system.

If the electronic control unit executes control to turn OFF the switching elements in the normal system, the switching element controlled into OFF state can prevent a power supply current from flowing into the ground point. Regardless of whether the power supply relay is turned ON or OFF, similar advantageous functions and effects can be obtained.

Moreover, as in the control pattern of FIG. 8, if any phase drive line is grounded, electronic control unit 150 can execute control to turn OFF the high-potential side switching element and turn ON the low-potential side switching element. In this case, the high-potential side switching element controlled into OFF state can prevent a power supply current from flowing into the ground point. Thus, regardless of whether the power supply relay is turned ON or OFF, similar advantageous functions and effects can be obtained.

In other words, the control pattern of FIG. 8 is applicable to a drive circuit not equipped with the power supply relay that interrupts power supply to the inverter.

Here, in the control patterns of FIGS. 5, 7, and 8, the same ON/OFF control is executed on the switching element and the power supply relay in case of the short-to-supply of any phase drive line. Even according to the control pattern of FIG. 8, electronic control unit 150 can execute control to turn either ON or OFF the power supply relay in case of the short-to-supply.

More specifically, according to the control pattern of FIG. 8 as well as the control pattern of FIG. 5 or 7, a continuous braking current can be generated. In addition, there achieve advantageous function and effect that a braking current less fluctuates according to the fault type and also there is no necessity to execute fault control on the power supply relay regardless of the fault type.

Note that the control patterns of FIGS. 5, 7, and 8 can be appropriately combined to execute control for all types of fault, for example, so as to turn ON the high-potential side switching element and turn OFF the low-potential side switching element or execute control for all types of fault but a short-to-supply so as to turn ON the low-potential side switching element and turn OFF the high-potential side switching element.

Furthermore, according to the control patterns of FIGS. 7 and 8, electronic control unit 150 executes control to turn ON all of the high-potential or low-potential side switching elements including the short-circuited switching element. However, the electronic control unit can execute control to turn ON all the switching elements but the short-circuited one, while turning OFF the short-circuited switching element.

In step S507 of the flowchart illustrated in FIG. 4, according to the pattern of FIG. 5, 7, or 8, electronic control unit 150 controls the switching elements into a predetermined condition, and then proceeds to step S508 to calculate a braking torque generated in the first energization system based on the rotational speed of electric motor 130.

For example, the following configuration can be adopted. That is, a table for converting the rotational speed of electric motor 130 into a braking torque is provided, and electronic control unit 150 calculates a braking torque corresponding to a motor rotational speed in question based on the table.

Here, a continuous braking current is generated by controlling the switching element with electronic control unit 150 in step S507, hereby enhancing the accuracy of calculating a braking torque based on the motor rotational speed compared to the half-wave braking current.

In addition, electronic control unit 150 executes ON/OFF control on the switching elements in step S507, whereby the phase-to-phase impedance reduces with little fluctuation, and the braking current less varies depending on the type of fault. This control also enhances the accuracy of calculating the braking torque based on the motor rotational speed.

After calculating the braking torque in step S508, electronic control unit 150 proceeds to step S509 to add the total target assist torque calculated in step S501 and a braking torque of the first energization system and then, sets the resultant as a final target assist torque.

In other words, even if the target assist torque calculated in step S501 is generated by controlling energization to the second energization system, an actual motor torque is reduced by the braking torque generated in the first energization system.

In view of the above, the target assist torque is increased by the braking torque in advance, whereby a desired target assist torque can be actually generated.

Hence, even if abnormal energization occurs in either the first energization system or the second energization system and a braking torque is generated in the energization system involving the abnormal energization, a desired assist toque or its equivalent can be generated to avoid lowering the steering control performance due to the abnormal energization.

Note that electronic control unit 150 can make correction to reduce the braking torque calculated in step S508 and then add the reduced braking toque to the total target assist torque calculated in step S501. Also in this case, it is possible to suppress reduction in motor torque, which will occur with the braking torque generated in the first energization system.

Next, electronic control unit 150 proceeds to step S510 to execute PWM control on the switching element in second inverter 1B second energization system based on the target assist torque set in step S509.

In other words, if any fault occurs in the first energization system, the PWM control on first inverter 1A of the first energization system is suspended and the duty ratio of PWM control on each switching element in second inverter 1B is controlled so that currents flow into each coil of second coil set 2B at the d-axis current command value $I_d^*$ and the q-axis current command value $I_q^*$ corresponding to the target assist torque.

On the other hand, after determining that any fault occurs in the second energization system in step S503, electronic control unit 150 proceeds to step S511. Similar to step S507, according to the control pattern illustrated in FIG. 5, 7, or 8, the electronic control unit controls each switching element of second inverter 1B in the second energization system to turn ON at least one of the high-potential side switching element and the low-potential side switching element in second inverter 1B.

Then, electronic control unit 150 proceeds to step S512 to calculate a braking torque generated in the second energization system based on the motor rotational speed and in subsequent step S513, make correction to increase the total target assist torque according to the braking torque generated in the second energization system, hereby setting the resultant as a final target assist torque.

Furthermore, in step S514, electronic control unit 150 executes PWM control on the switching element of first inverter 1A in the first energization system according to the target assist torque set in step S513.

Furthermore, after determining that any fault occurs in the second energization system as well as the first energization system in step S506, electronic control unit 150 proceeds to step S515 to execute control to turn OFF all switching elements of first inverter 1A and all switching elements of second inverter 1B and in addition, turn OFF the power supply relays 304A and 304B both, hereby stopping the driving of electric motor 130.

FIG. 9 is a schematic diagram illustrating the correlation between the total target assist torque and the target assist torque shared between the first energization system and the second energization system in two patterns: the case where the first energization system and the second energization system are both normally operating and the case where any fault occurs in the first energization system.

As illustrated in FIG. 9, if the first energization system and the second energization system are both normally operating, a half of the total target assist torque is assigned to the first energization system and the remaining to the second energization system so that the motor torque generated by controlling energization to the first energization system and the motor torque generated by controlling energization to the second energization system can sum up to the total target assist torque.

On the other hand, for example, in case the abnormal energization occurs in the first energization system, the driving of the motor with the first energization system is suspended, but a braking torque as a negative torque is generated in the first energization system. Thus, the electronic control unit sets as the target assist torque for the second energization system, the total sum of the total target assist torque and the absolute value of the braking torque. The electronic control unit causes the second energization system to drive the motor so as to generate a motor torque corresponding to the total target assist torque and a torque enough to cancel out the braking torque.

Here, in electric power steering device 100, electric motor 130 intentionally generates a braking force, i.e., negative torque in some cases such as turning the steering wheel back to the neutral position.

Figure 10:
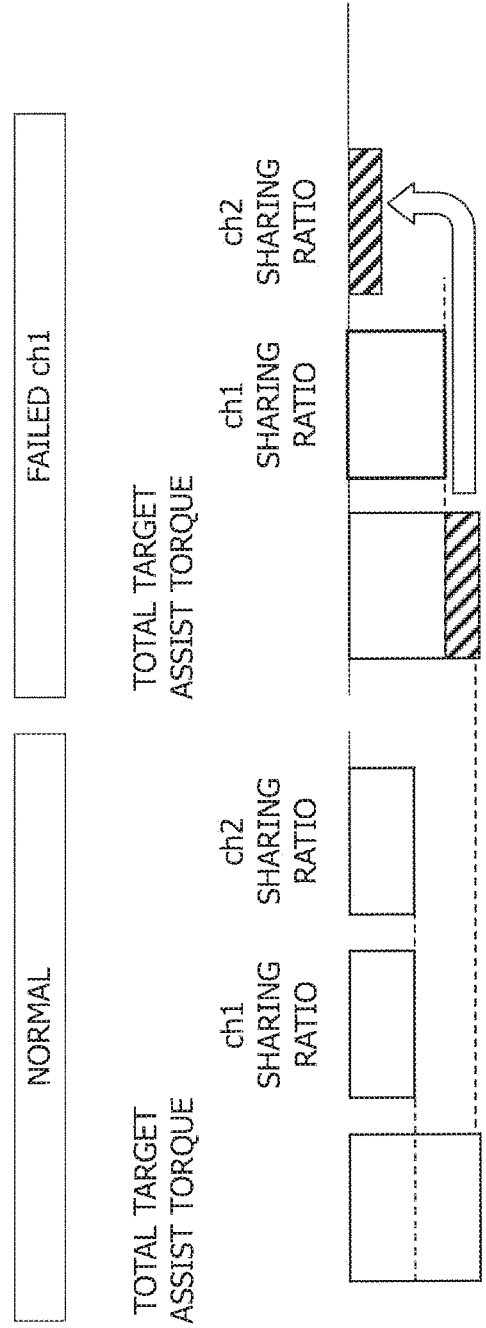
FIG. 10 is an explanatory view illustrating an example of setting a target assist torque for each energization system in case of abnormal energization according to an embodiment of the present invention.

FIG. 10 is a schematic diagram illustrating the correlation between the total target assist torque and the target assist torque shared between the first energization system and the second energization system in the case where electric motor 130 intentionally generates a braking force.

When electric motor 130 generates a braking force, the total target assist torque is set as a negative torque. If the first energization system and the second energization system are normally operating, a half of the total target assist torque is assigned to the first energization system and the remaining to the second energization system so that a negative motor torque generated by controlling energization to the first energization system and a negative motor torque generated by controlling energization to the second energization system can sum up to the total target assist torque.

On the other hand, for example, if any fault occurs in the first energization system, the driving of the motor with the first energization system is suspended, but the first energization system generates a braking force as a negative torque. Thus, the target braking torque is reduced by the braking torque generated in the first energization system, and the resultant is set as the target braking torque to be generated by driving the motor with the second energization system. The electronic control unit executes control so that the braking torque generated in the first energization system and the braking torque intentionally generated by driving the motor with the second energization system sum up to the target braking torque.

Note that in order to avoid such a situation that when electric motor 130 generates a braking force, a braking torque is excessively generated due to an error in calculating a braking torque generated in the energization system involving the abnormal energization, a calculation result of the braking torque generated in the energization system involving the abnormal energization is corrected to increase. The increased braking torque is subtracted from the total sum. The resultant can be used as a target braking torque for a normal energization system.

Figure 11:
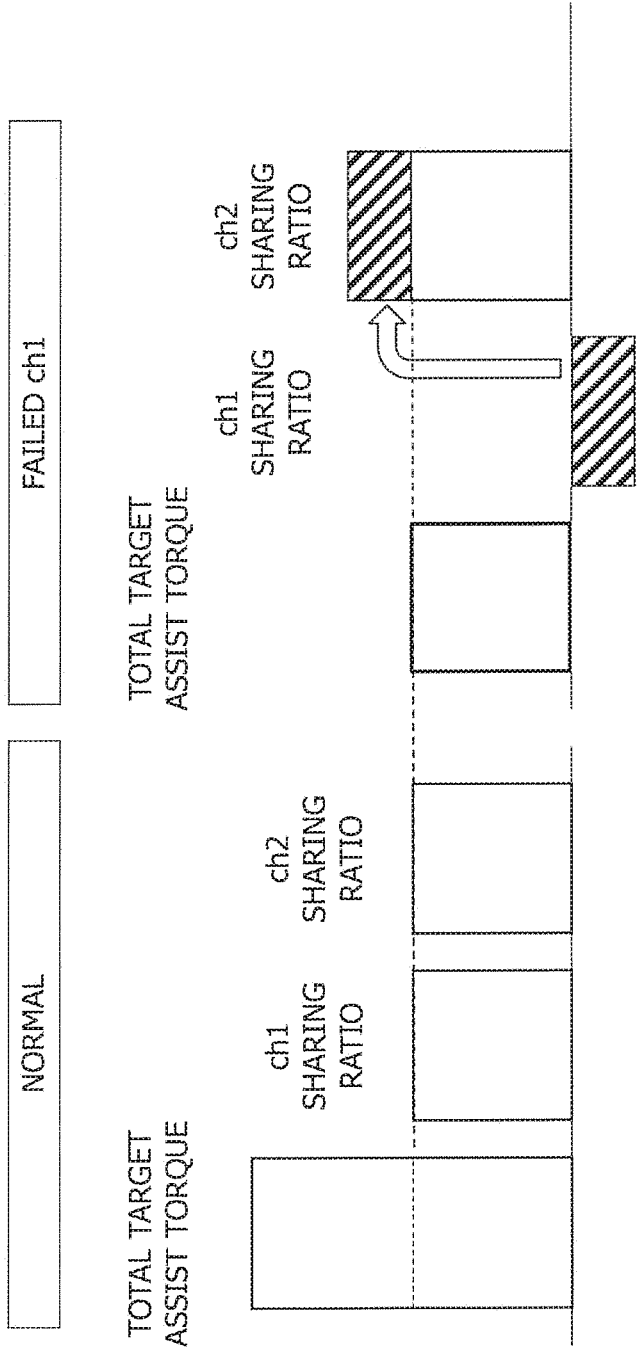
FIG. 11 is an explanatory view illustrating an example of setting a target assist torque in each energization system in case of abnormal energization according to an embodiment of the present invention.

As illustrated in FIG. 11, the total target assist torque can be different in the cases where both the first energization system and the second energization system are normally operating and where either the first energization system or the second energization system suffers from any fault.

In the illustrated example of FIG. 11, the electronic control unit sets the total target assist torque of when either the first energization system or the second energization system suffers from any fault, as a half of the total target assist torque of when both the first energization system and the second energization system are normally operating.

If the first energization system suffers from any fault, the electronic control unit defines as the target assist torque for the second energization system, the total sum of the half of the total target assist torque obtained under the normal condition and the absolute value of the braking torque generated in the first energization system.

Note that in the configuration that the total target assist torque of when either the first energization system or the second energization system suffers from any fault is set lower than the total target assist torque of when both the first energization system and the second energization system are normally operating, the reduction rate of the total target assist torque is not limited to a half of the torque obtained under the normal condition and can be, needless to say, arbitrarily determined.

Furthermore, the present invention is not limited to the configuration that if both the first energization system and the second energization system are normally operating, the target assist torque for the first energization system and that for the second energization system are set to the same value. Instead of this configuration, it is possible to increase the target assist torque of the system having completed the initial diagnosis ahead of the other at the startup or change the sharing ratio of the total target assist torque according to the temperature levels of first inverter 1A and second inverter 1B.

Hereinbefore, the present invention is described in detail on the basis of the preferred embodiments but it is obvious that one skilled in the art can make various modifications within the basic technical ideas and teachings of the present invention.

Figure 12:
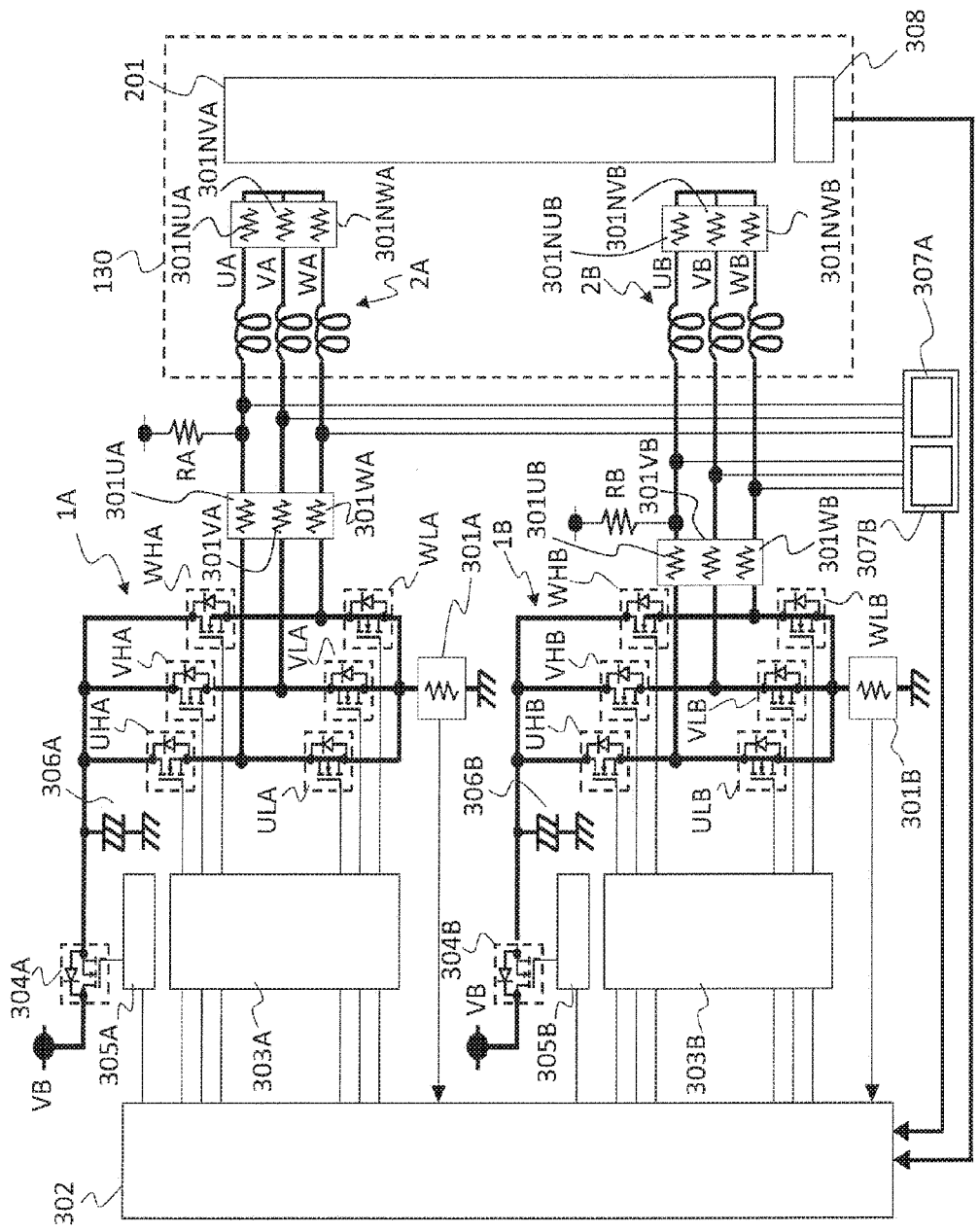
FIG. 12 is a circuit diagram illustrating an example of the layout of current sensors in a drive controller according to an embodiment of the present invention.

In the illustrated example of the circuit configuration in FIG. 2, current sensors 301A and 301B for detecting drive current for electric motor 130 are provided between the ground point and sources of low-potential side semiconductor switches UL, VL, and WL in first inverter 1A and second inverter 1B. The present invention, however, is not limited to this configuration For example, as illustrated in FIG. 12, it is possible to provide current sensors 301UA, 301VA, 301WA, 301UB, 301VB, and 301WB on the drive lines connecting between three-phase coils U, V, and W and connection points among low-potential side semiconductor switches UL, VL, and WL and high-potential side semiconductor switches UH, VH, and WH as well as provide current sensors 301NUA, 301NVA, 301NWA, 301NUB, 301NVB, and 301NWB between three-phase coils U, V, and W and the neutral point.

If there provide current sensors 301UA, 301VA, 301WA, 301UB, 301VB, and 301WB or current sensors 301NUA, 301NVA, 301NWA, 301NUB, 301NVB, or 301NWB, a current can be directly detected on the path through which a braking current flows. Electronic control unit 150 calculates a braking torque based on the detected braking current in steps S508 and S512 in the flowchart of FIG. 4.

Also in the case of detecting a braking current with the current sensor as above, a continuous braking current, not half wave, is generated through the processing in steps S507 and S511 to thereby facilitate the compensation control for the target assist torque based on the detected braking current. A control program can be hereby simplified. Hence, a development cost for the control program can be saved and the capacity of the control program can be reduced, leading to reduction in product cost.

The above drive controller and control method are applicable to an electric motor where three-phase coils U, V, and W are connected by means of delta connection and electric motor 130 having three-phase coils U, V, and W of different phases as well as electric motor 130 having three-phase coils U, V, and W star-connected.

Moreover, the power supply relay can be provided on each drive line connecting between connection points among low-potential side semiconductor switches UL, VL, and WL and high-potential side semiconductor switches UH, VH, and WH, and three-phase coils U, V, and W.

Furthermore, the above drive controller and control method are applicable as well to an electric motor equipped with three or more coil sets including three-phase coils U, V, and W and three or more inverters for driving the respective coil sets, i.e., an electric motor equipped with three or more energization systems.

REFERENCE SYMBOL LIST 1A first inverter
1B second inverter
2A first coil set
2B second coil set
3 target current value calculating unit
4 output voltage calculating unit
5 motor rotational speed calculating unit
6 target assist torque calculating unit
7A first output duty calculating unit
7B second output duty calculating unit
8A first two-to-three phase converting unit
8B second two-to-three phase converting unit
9A first dead time compensation unit
9B second dead time compensation unit
11 three-to-two phase converting unit
130 electric motor
150 electronic control unit
301A, 301B current sensor
302 microcomputer
304A, 304B power supply relay
307A, 307B voltage monitor circuit
UHA, VHA, WHA, UHB, VHB, WHB high-potential side switching element
ULA, VLA, WLA, ULB, VLB, WLB low-potential side switching element

The invention claimed is:

1. A drive controller for an electric motor equipped with a plurality of energization systems and a plurality of power supply relays, the plurality of energization systems composed of coils corresponding to a plurality of phases, and a high-potential side switching element and a low-potential side switching element, both of which are provided in each of the phases, and the plurality of power supply relays configured to individually switch ON/OFF of power supply to the respective plurality of energization systems, the drive controller being configured to
   detect a failed system of the energization systems, which involves short-circuiting in the high-potential side switching element,
   control the power supply relays of the failed system to be turned OFF, and, in such a state, execute control to turn ON all low-potential side switching elements in the failed system, and
   perform a switching operation of the high-potential side switching element and low-potential side elements in a normal system of the energization systems so as to change a torque to be generated in the normal system, based on a torque generated in the failed system.

2. The drive controller for an electric motor according to claim 1, wherein the drive controller is configured to
   obtain an estimated value of a torque generated in the failed system based on a rotational speed of the electric motor, and
   change a torque to be generated in the normal system based on the estimated value.

3. The drive controller for an electric motor according to claim 1, wherein the electric motor is configured to generate an assist force and a braking force in a vehicle power steering device, and the drive controller is configured to
   increase an assist torque to be generated in the normal system based on a torque generated in the failed system, in a case of generating an assist force with the electric motor, and
   decrease a braking torque to be generated in the normal system based on a torque generated in the failed system in a case of generating a braking force with the electric motor.

4. The drive controller for an electric motor according to claim 1, wherein the drive controller is configured to change a torque to be generated in the normal system so as to generate a torque obtained when the energization systems normally operate.

5. The drive controller for an electric motor according to claim 1, wherein the drive controller is configured to
   when any one of the energization systems suffers from short-circuiting in the high-potential side switching element, set a second target torque lower than a first target torque obtained when the energization systems normally operate, and change a torque to be generated in the normal system so as to generate the second target torque.

6. A drive controller for an electric motor equipped with a plurality of energization systems and a plurality of power supply relays, the plurality of energization systems composed of coils corresponding to a plurality of phases, and a high-potential side switching element and a low-potential side switching element, both of which are provided in each of the phases, and the plurality of power supply relays configured to individually switch ON/OFF of power supply to the respective plurality of energization systems, the drive controller being configured to detect a failed system of the energization systems, which involves at least one of short-circuiting in the low-potential side switching element or a short-to-ground of a drive line in each of the phases, control the power supply relays of the failed system to be turned OFF, and, in such a state, execute control to turn ON all high-potential side switching elements in the failed system, and perform a switching operation of the high-potential side switching element and low-potential side switching elements in a normal system of the energization systems so as to change a torque to be generated in the normal system, based on a torque generated in the failed system.

7. The drive controller for an electric motor according to claim 6, wherein the drive controller is configured to obtain an estimated value of a torque generated in the failed system based on a rotational speed of the electric motor, and change a torque to be generated in the normal system based on the estimated value.

8. The drive controller for an electric motor according to claim 6, wherein the electric motor is configured to generate an assist force and a braking force in a vehicle power steering device, and the drive controller is configured to increase an assist torque to be generated in the normal system based on a torque generated in the failed system, in a case of generating an assist force with the electric motor, and decrease a braking torque to be generated in the normal system based on a torque generated in the failed system in a case of generating a braking force with the electric motor.

9. The drive controller for an electric motor according to claim 6, wherein the drive controller is configured to change a torque to be generated in the failed system so as to generate a torque obtained when the energization systems normally operate.

10. The drive controller for an electric motor according to claim 6, wherein the drive controller is configured to when any one of the energization systems suffers from at least one of short-circuiting in the low-potential side switching element or a short-to-ground of a drive line in each of the phases, set a second target torque lower than a first target torque obtained when the energization systems normally operate, and change a torque to be generated in the normal system so as to generate the second target torque.

11. A drive control method for an electric motor equipped with a plurality of energization systems and a plurality of power supply relays, the plurality of energization systems composed of coils corresponding to a plurality of phases, and a high-potential side switching element and a low-potential side switching element, both of which are provided in each of the phases, and the plurality of power supply relays individually switching ON/OFF of power supply to the respective plurality of energization systems, the method comprising:

detecting a failed system of the energization systems, which involves short-circuiting in the high-potential side switching element;

causing control of the power supply relays of the failed system to be turned OFF, and, in such a state, executing control to turn ON all low-potential side switching elements in the failed system; and performing a switching operation of the high-potential side switching element and the low-potential side switching elements in a normal system of the energization systems so as to change a torque to be generated in the normal system, based on a torque generated in the failed system.

12. A drive control method for an electric motor equipped with a plurality of energization systems and a plurality of power supply relays, the plurality of energization systems composed of coils corresponding to a plurality of phases, and a high-potential side switching element and a low-potential side switching element, both of which are provided in each of the phases, and a plurality of power supply relays individually switching ON/OFF of power supply to the respective plurality of energization systems, the method comprising:

detecting a failed system of the energization systems, which involves at least one of short-circuiting in the low-potential side switching element or a short-to-ground of a drive line in each of the phases;

causing control of the power supply relays of the failed system to be turned OFF and, in such a state, executing control to turn ON all high-potential side switching elements in the failed system; and performing a switching operation of the high-potential side switching element and low-potential side switching elements in a normal system of the energization systems, so as to change a torque to be generated in the normal system, based on a torque generated in the failed system.

\* \* \* \* \*